United States Patent [19]
Gundy

[11] Patent Number: 5,431,459
[45] Date of Patent: Jul. 11, 1995

[54] BAND WITH SLOTTED WEDGE CAMS
[75] Inventor: William P. Gundy, Milford, N.H.
[73] Assignee: NPC, Inc., Milford, N.H.
[21] Appl. No.: 7,202
[22] Filed: Jan. 22, 1993

Related U.S. Application Data

[63] Continuation-in-part of Ser. No. 919,061, Jul. 23, 1992, abandoned, which is a continuation of Ser. No. 652,813, Feb. 8, 1991, abandoned.

[51] Int. Cl.⁶ .......................... F16L 5/00; F16L 41/08
[52] U.S. Cl. ................................. 285/237; 285/230; 277/207 A; 24/268
[58] Field of Search ............... 285/237, 230, 236, 158; 277/207 A, 9.5; 24/268, 19

[56] References Cited

U.S. PATENT DOCUMENTS

| | | | |
|---|---|---|---|
| 2,803,866 | 8/1957 | Flora | 24/268 |
| 2,922,212 | 1/1960 | Textrom | 24/268 |
| 3,958,313 | 5/1976 | Rossborough | 285/230 |
| 4,242,164 | 12/1980 | Skinner | 277/207 A |
| 4,478,437 | 10/1984 | Skinner | 285/237 |
| 4,702,645 | 10/1987 | Skinner et al. | 285/230 |
| 4,715,626 | 12/1987 | Gehring et al. | 285/230 |
| 4,890,863 | 1/1990 | Westhoff et al. | 285/230 |
| 4,927,189 | 5/1990 | Burkit | 285/158 |
| 5,024,404 | 6/1991 | Ballard | 24/268 |
| 5,029,907 | 7/1991 | Gundy | 285/158 |

Primary Examiner—Eric K. Nicholson
Attorney, Agent, or Firm—Pearson & Pearson

[57] ABSTRACT

A band assembly for effecting a seal particularly adapted for use in establishing a joint between a sewer pipe and a reinforced concrete manhole riser. The seal is affected by a tapered elastomeric tubular connector boot and a clamping band member with an expansion mechanism. Wedge followers are loosely captured in the end sections of the clamping band and lie along a circumferential center line on the band. Driving wedges extend along an axis transverse to the circumferential center line. The wedge followers and wedge drivers both have divergent edge sections that interengage and slide over one another as the driving wedges are pulled together by a clamping mechanism comprising, in a simplest form, a nut and bolt. As the driving wedges move toward the circumferential center line, they displace the wedge followers. The wedge followers engage the end portions of the clamping band and force it and the connector boot into a sealing relationship with the surrounding manhole riser.

39 Claims, 7 Drawing Sheets

BAND WITH SLOTTED WEDGE CAMS

CROSS REFERENCE TO RELATED APPLICATIONS

This is a continuation-in-part of my U.S. patent application Ser. No. 07/919,061 filed Jul. 23, 1992 (now abandoned) for an Improved Band with Slotted Wedge Cams that is a continuation of U.S. patent application Ser. No. 07/652,813 filed Feb. 8, 1991 (now abandoned).

BACKGROUND OF THE INVENTION

1. Field of the Invention

This invention generally relates to sealing arrangements for pipe joints and more specifically to an improved clamping device for effecting a seal between a pipe and a manhole.

2. Description of Related Art

Various proposals exist for connecting pipes to manholes in sewer systems. For example, U.S. Pat. No. 3,958,313 for a Method, Apparatus and Product for Improved Pipe-to-Manhole Sealing issued May 25, 1976 to the same assignee as the present invention discloses an underground joint between a sewer pipe and a reinforced concrete manhole riser. A flexible boot slips over the free end of the pipe and an external clamp compresses the seal onto the pipe to produce a boot-to-pipe seal. The other end of the boot penetrates an aperture in a manhole through a normally core-drilled opening in a riser wall. The end of the boot fits in the aperture. A clamping assembly with a clamping band and an integral toggle expander fits inside the boot in alignment with the riser wall. When the toggle expander is operated, it expands the band into the boot and compresses the boot against the riser to produce a boot-to-riser seal.

Occasionally it is necessary to remove the connector from the riser because of improper installation of the seal or an incorrectly sized clamping assembly. In these cases both the clamping band and toggle, that constitute an integral unit, had to be replaced. As disclosed in my U.S. Pat. No. 5,029,907 issued Jul. 9, 1991 for a Band For Effecting A Seal that is assigned to the same assignee as this invention, an integrally formed toggle nests in the end sections of a band and expands the band when a hydraulic jack or other means forces a center vee-shaped portion of the toggle radially outward.

Core drilling through a concrete riser wall produces a porthole of nominal diameter, but occasionally because of core drill outer roundness caused by damage, the actual size will vary from site to site. Optimal sealing must occur over the entire range of variations. It is difficult to achieve optimal sealing with the toggle and clamp of either of the foregoing references if the hole size variations exceed a narrow range.

Another construction of a clamping band for sewer pipe applications utilizes wedge-shaped cam members for acting with followers on a clamping band. As disclosed hereinafter, this approach is more readily accommodates a wider range of hole size variations. Essentially two wedge-shaped members are drawn together by a bolt and nut. The cam members drive follower members, affixed to the band, circumferentially apart. Although this structure has been available for a number of years and provides superior sealing to the toggle structures, it has not been widely accepted, particularly with compression bands for smaller diameter pipes, because the costs of such structures are not justified for smaller diameter pipes. In part this cost reflects a need to maintain an inventory of separate clamping structures for each pipe diameter. Thus, two basic clamping band structures continue to be used and for smaller pipes, optimal sealing force are compromised for reduced costs.

SUMMARY

Therefore it is an object of this invention to provide an expansible clamping band with a wide range of clamping adjustments.

It is another object of this invention to provide an expansible clamping band that is less expensive to manufacture.

Yet another object of this invention is to provide an expansible clamping mechanism that is economical to utilize and accommodates a wide range of pipe sizes.

In accordance with one aspect of this invention, an expansion means for altering the separation between first and second end sections of an expandable clamping member include first and second integral follower means and first and second integral wedge means. Each of the first and second integral follower means has a shank portion for insertion into a corresponding end section of the clamping member and a trapezoidal head portion with a base that overlies the end section. Divergent planar edge portions constitute the sides of the trapezoid and each follower has an outer surface that corresponds to the nominal radius of curvature. Each of the wedge means is adapted for lying in a spaced relationship along an axis that is transverse to the center line and has a generally trapezoidal shape. Edge structures diverge with respect to the transverse axis and parallel the follower edges and terminate with outwardly facing open channels for receiving the planar edges of the followers. The wedge means also have an outer surface for disposition about the transverse axis that corresponds to the nominal radius of curvature. A compression mechanism engages the wedge means and displaces them relative toward the center line thereby to displace the follower means and change the separation between the first and second end sections of the clamping member.

In accordance with another aspect of this invention, the apparatus for effecting the seal includes a flexible connector boot having a first end portion that inserts in the opening of a manhole riser and a second end portion that receives a pipe. A central transition portion interconnects the first and second end portions. A clamping band extends along a circumferentially extending center line with spaced first and second end sections in an expansion structure for altering the separation between the first and second end sections. The connector includes a pocket formed at the first circular end section for receiving the expansion structure.

BRIEF DESCRIPTION OF THE DRAWINGS

This invention is pointed out with particularity in the appended claims. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
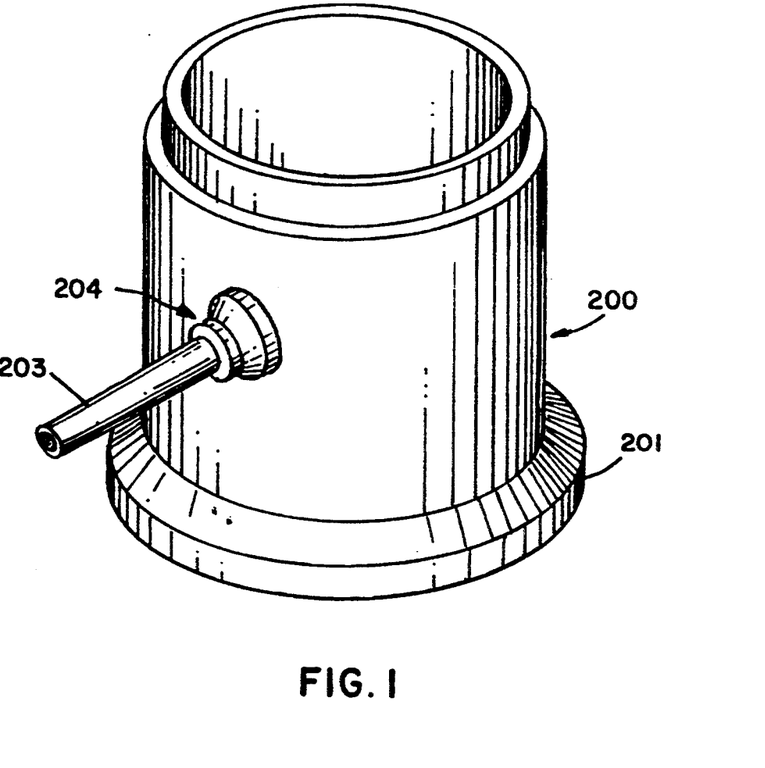
FIG. 1 is a perspective view of a sewer pipe and manhole riser sealably joined together by means of a connector boot of the type illustrated in FIG. 2 and adapted for utilizing a connector band and expansion mechanism as shown in FIGS. 4 through 7.
Figure 2:
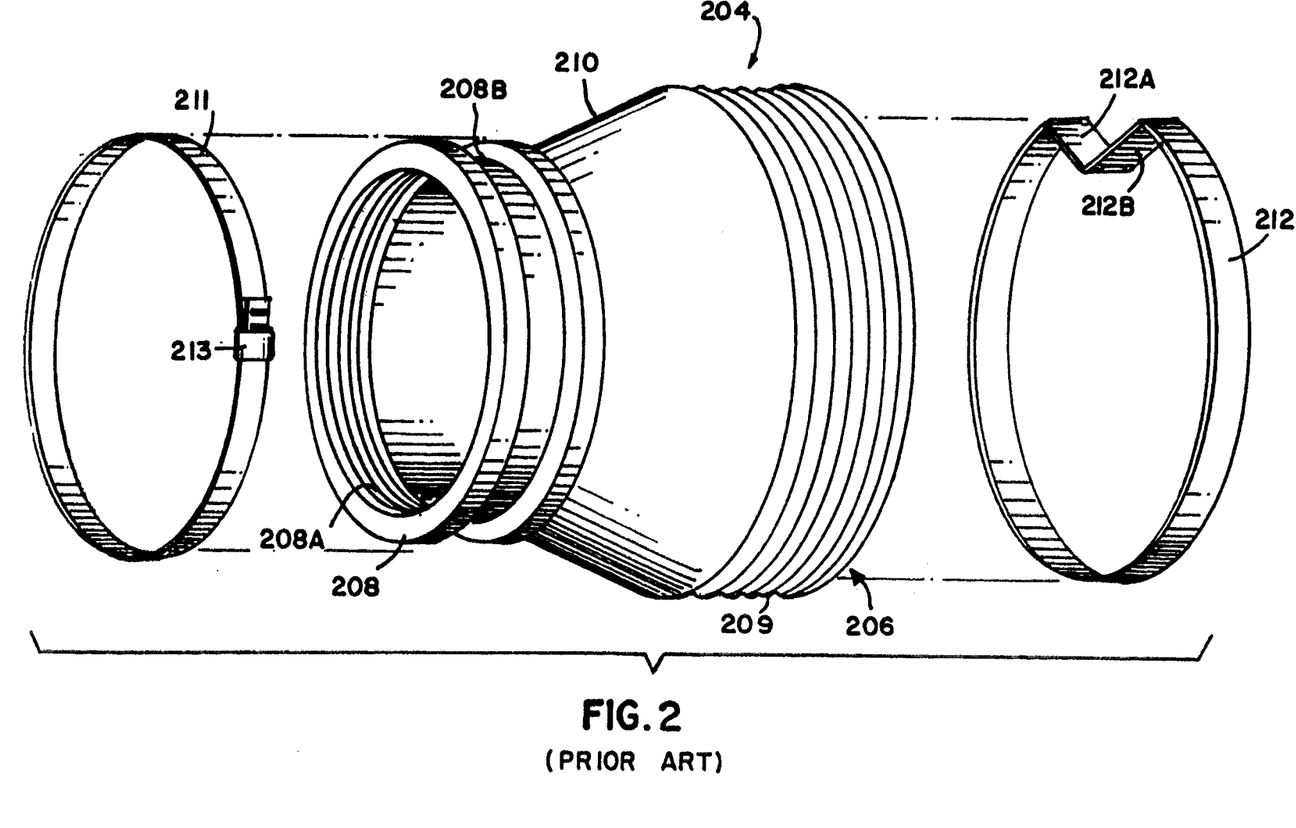
FIG. 2 is an exploded view showing, in perspective, sealing joint components of one embodiment in the prior art.

FIGS. 1 and 2 correspond to FIGS. 16 and 18 in U.S. Pat. No. 3,958,313 and also use the same reference numerals. By way of background, FIG. 1, discloses a manhole riser 200 mounted on a base 201 and having formed therein, by core drilling or other similar procedure, a port hole into which the extremity of a pipe 203 is inserted. The outer diameter of the pipe 203 is appreciably smaller than the inner diameter of the port hole.

The pipe 203 and the riser 200 are held in a sealably joined relationship by a clamp pipe connector boot assembly generally denoted by arrow 204. The connector boot assembly 204 and a clamping band of the prior art are shown in more detail removed from the riser and pipe in FIG. 2.

As shown more clearly in FIG. 2, the connector boot 204 comprises an elongated, flexible tubular body having an internal clamping end 206 of a cylindrical shape and size suitable for loosely engaging within a porthole. Located around the outer surface of the clamping end 206 are spaced beads or ribs 209 which are deformable under pressure to fill in irregularities in the riser porthole edge in the fully clamped position.

Pressure is exerted against the clamping end 206 by an internal clamping band 212 which includes a toggle expander device consisting of toggle arms 212A and 212B. The band and toggle arms can be forced into a position in which they are essentially aligned such that the band 212 becomes expanded under relatively high pressures and the end 206 of the connector boot 204 is thereby compressed solidly against the porthole edge. When an external device forces the toggle expander arms 212A and 212B into an aligned position, the toggle arms move outwardly and radially of the porthole and provide an over-center travel which positions the arm in a self-locking position so they constantly maintain pressure on the clamping band 212.

At its opposite extremity, the tubular connector body 204 is formed with an external clamping end 208 also of a cylindrical shape, but appreciably smaller than the end 206 so as to loosely engage around the outer periphery of the pipe 203 in FIG. 1. This end 208 is also formed with a series of beads 208A. An external clamping band 211 located in a channel 208B is solidly clamped by screwdriver pressure exerted through a tightening screw 213. This pressure deforms the beads 208A and clamps the end 208 in tightly sealed relationship around the pipe.

Extending between the parts 206 and 208 of the connector boot is an intermediate flexible tubular body portion 210 which is of a gradually decreasing size and designed to yieldably join the parts 206 and 208 together so that relative movement of one to the other may take place under varying stress forces.

Figure 3:
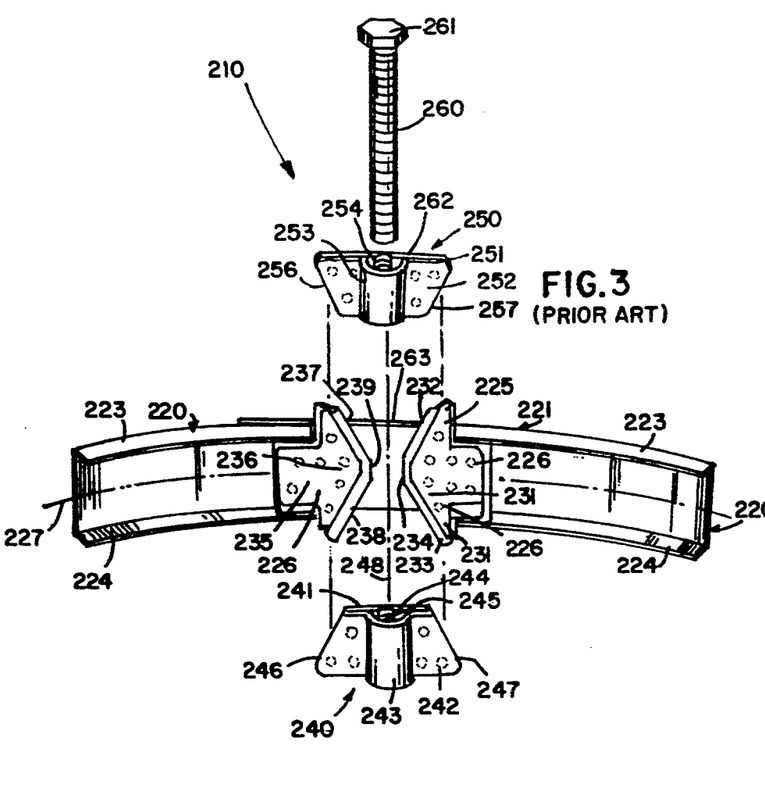
FIG. 3 is an exploded view showing another embodiment of an expansion mechanism of the prior art.

FIG. 3 discloses an expansion mechanism 210 of the prior art for use in producing a seal. The expansion mechanism 210 interacts with a clamping band 220, a portion of which is shown in FIG. 3 that has end sections 221 and 222 and has circumferentially extending inwardly turned lips 223 and 224 for radial strength. The end sections 221 and 222 receive stamped, metal wedge followers 225 and 226 that are permanently welded to the end sections 221 and 222 of the band 220 respectively. These wedge followers extend generally along a circumferential center line 227 through the band 220.

Referring to the wedge follower 225, a shank 226 fits between the lips 223 and 224. A trapezoidal head 231 has edge structures 232 and 233 that diverge from an apex 234 on the circumferential center line 227. The edge structures 232 and 233 diverge as they extend toward the shank 226. One base of the head 231 abuts the edges of the lips 223 and 224 and a portion of the band 220 backs the head portion 231. The edge structures 232 and 233 have a channel-like shape. The wedge follower 226 has a similar construction with a shank 235, a head 236, and divergent edges 237 and 238 that extend back from an apex 239.

The wedge expansion system also includes a driving wedge or cam 240 that has a general shape of a trapezoid formed by an outer plate 241 and inner plate 242 that are welded together. The inner plate 242 includes a saddle 243 that forms a cylinder 244 with the outer plate 241. The cylinder 240 is tapped to provide internal threads 245. The wedge 240 additionally has diverging edges 246 and 247 that taper outward from a transverse center line 248, the minor side of the trapezoidal wedge member 240 facing the band and being parallel to the center line 227.

A complementary driving wedge 250 has an outer plate 251 and an inner plate 252 with a central saddle 253. The saddle forms a cylinder 254 that is counterbored. Divergent edges 256 and 257 extend outwardly and transverse to the center line 248. A bolt 260 passes through the clearance hole 254 in the driving wedge 250 and engages the threads 245 in the wedge 240. Divergent edges 246 and 247 engage the channels 233 and 238 respectively of the wedge followers 226 and 235. Similarly the divergent edges 256 and 257 of the driving wedge 250 engage the divergent edges 237 and 232 of the wedge followers 226 and 225. As the bolt 260 tightens, the bolt head 261 engages an upper edge 262 of the driving wedge 250 and the driving wedges 240 and 250 are drawn together and toward the center line 227. This causes the followers 225 and 226 to be displaced circumferentially apart in a direction parallel to the center line 227.

An elongated tab 263 formed to one end section of the clamping band 220 has a sufficient length to cover any gap that the driving wedges 240 and 250 can produce thereby to provide a continuous sealing band for producing a sealing force that acts radially outward.

As previously stated, this construction provides superior sealing, but is expensive to manufacture. This expense is not justified economically for use with seals of smaller diameter pipes. So toggle arrangements of the type shown in U.S. Pat. No. 5,029,907 have continued to be used to effect the seals in such applications.

Figure 4:
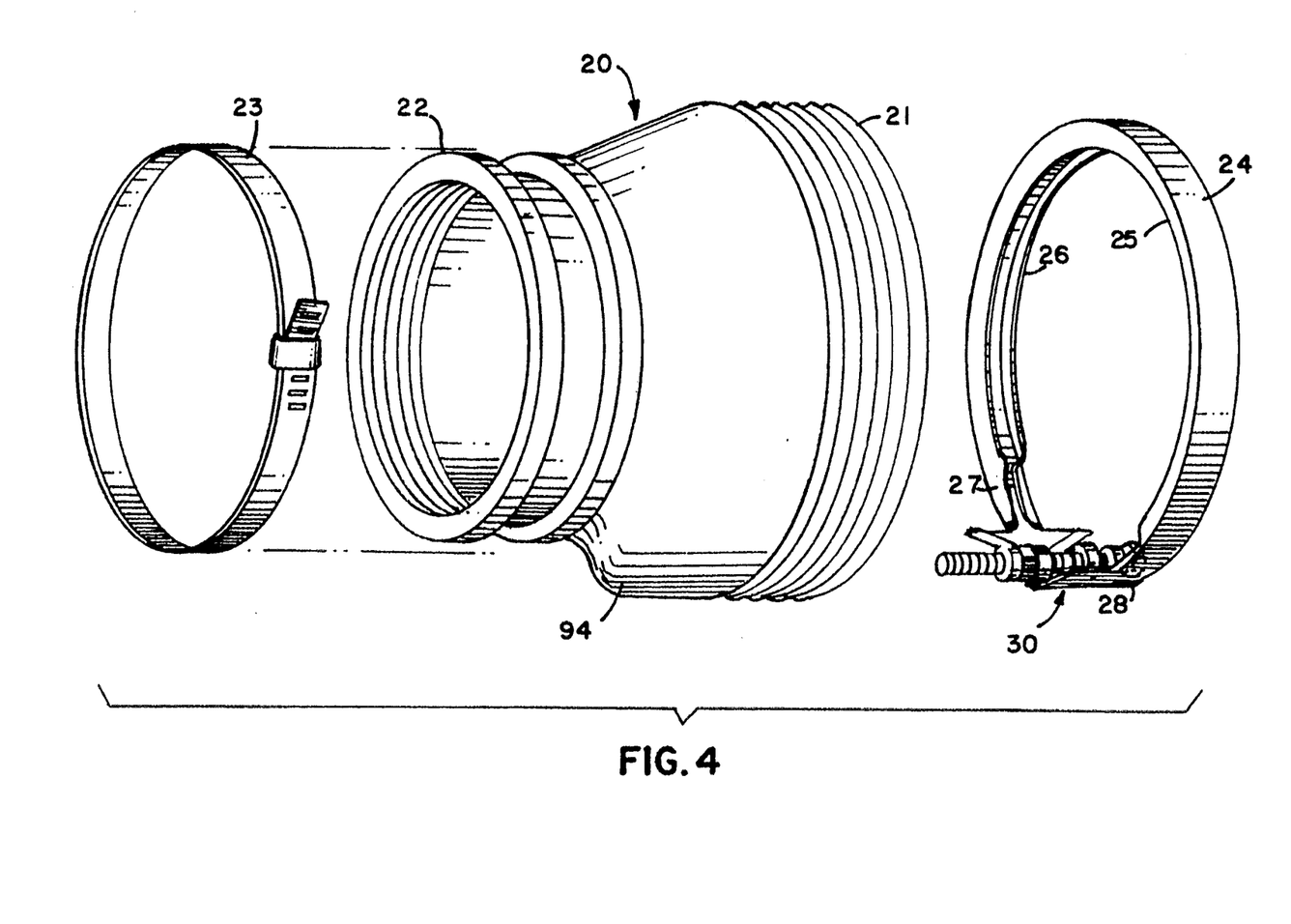
FIG. 4 is an exploded view of an expansion mechanism constructed in accordance with this invention.

FIG. 4 discloses a clamping band and expansion mechanism that provides the advantages of the structure of FIG. 3 at costs comparable to those of clamping bands with toggle expanders. As shown in FIG. 4, a connector boot 20 having a similar configuration as the connector boot 204 in FIGS. 1 and 2, has a first end 21 adapted to be inserted into a core drill opening in a manhole riser and a second end 22 adapted for surrounding a pipe and being sealed thereto by a clamping band 23 that is similar to the clamping band 211 shown in FIG. 2.

An annular clamping band 24 in FIG. 4 has radially extending inturned lips 25 and 26 extending about the circumference thereof for strength. An expansion mechanism 30 is positioned between end sections 27 and 28. The structure of the expansion mechanism 30 is shown in more detail in FIG. 5.

Figure 5:
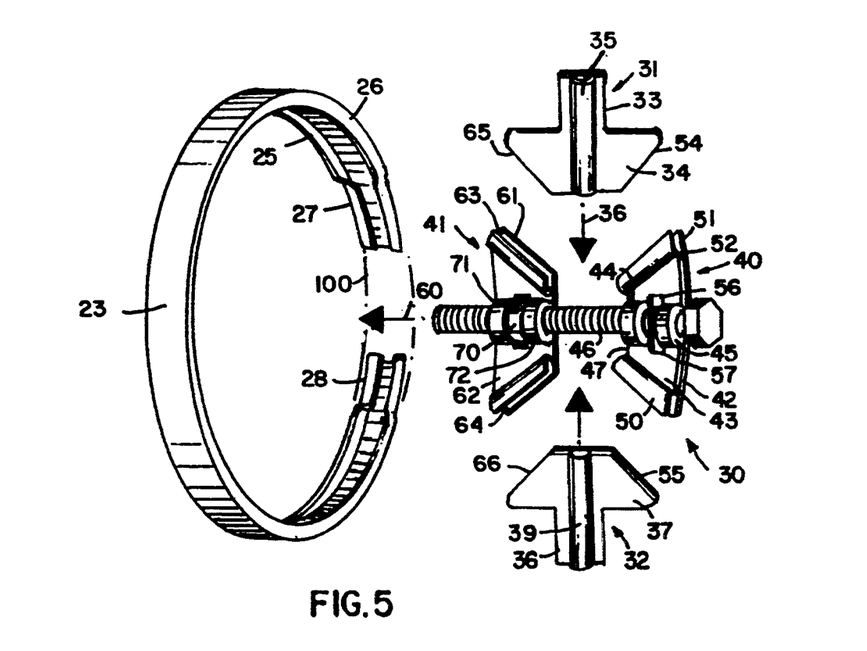
FIG. 5 is an exploded view of a compression band with an expansion mechanism that includes driving wedges and followers and that is adapted for use with this invention.

More specifically the lip portions 25 and 26 on the band 24 roll over to be parallel with the band 24 and spaced therefrom over the length of the end sections 27 and 28. The end sections 27 and 28 therefore serve as guides for receiving wedge followers 31 and 32 respectively. As shown in FIG. 5 the wedge follower 31 has a shank portion 33 and a trapezoidal head portion 34. A stiffening rib 35 extends through the shank and the head along a center line 36. The wedge follower 32 has a similar structure with a trapezoidal head 37, a shank 38 and a stiffening rib 39. These wedge followers 31 and 32 are readily stamped from a planar stainless steel or similar metal thereby to be produced in quantity at low cost.

The expansion mechanism 30 additionally comprises driving wedges 40 and 41. In this particular embodiment the driving wedge 40 has an outer plate 42 and an inner plate 43. The inner plate is formed with a pair of spaced saddles 44 and 45 that provide a clearance for a bolt 46. The driving wedge 40 additionally has a generally trapezoidal shape with a leading inner edge 47 and divergent edge sections 50 and 51 that extend to a rear base or outer edge portion 52 that is parallel to the inner edge portion 47. The edge sections 50 and 51 are formed as U-shaped channels to engage divergent edges 54 and 55 formed by the trapezoidal head sections 34 and 37. An aperture extends through the plates 42 and 43 intermediate the saddles 44 and 45 and the inner plate 43; tabs 56 and 57 are formed along edges parallel to an axis 60 about which the bolt 46 turns.

The driving wedge 41 has an identical structure and includes an outer plate 61 and an inner plate 62 formed with U-shaped channels 63 and 64 that define divergent edges. The channels 63 and 64 engage divergent edges 65 and 66 formed on the trapezoidal head portions 34 and 37 of the wedge followers 31 and 32. The driving wedge 41 has a standard hexagonal nut 70 located between spaced saddles 71 and 72. Tabs, described in detail later, on the driving wedge 41, which is identical to the driving wedge 40, engage the edges of the nut 70 thereby to prevent its rotation.

Both the driving wedges 40 and 41 are metal stampings. In this particular embodiment plates 42 and 43 are bonded together by being welded, as are the plates 61 and 62. However, the components of this expansion mechanism 30 are all inexpensive to manufacture. Moreover, a given set of mechanism components provide expansion mechanisms for bands 23 of different diameters. It is merely necessary to place the stamped wedge followers 31 and 32 and the driving wedges 40 and 41 in stamping dies to produce a radius of curvature for each of those pieces that corresponds to the radius of curvature of the band so the mechanism conforms to the band's profile and does not protrude therefrom. In the structure shown in FIG. 3, the use of such stamping operations to adapt the driving wedges 240 and 250 for different profiles could either close the clearance hole 254 or deform the cylinder 241 causing the integrity of the threaded connection to be lost. Threaded engagement in accordance with this invention, as shown in FIGS. 4 through 6, is limited solely on the integrity of a standard nut that is inserted after the structure is bent.

Figure 6:
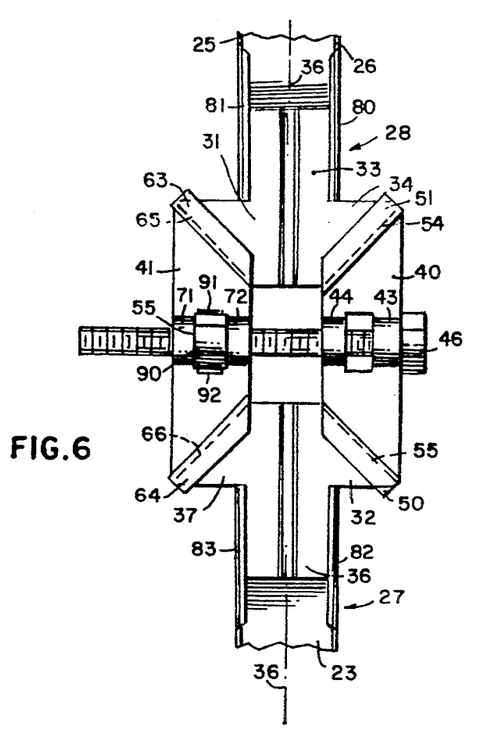
FIG. 6 is an enlarged assembled plan view of the expansion mechanism as shown in FIG. 5.

FIG. 6 discloses an assembled mechanism 30 intermediate the end sections 27 and 28 of the clamping band 23. As shown the end section 28 captures the wedge follower 31. The lips 25 and 26 are rolled parallel to the band 23 thereby to form channel sections 80 and 81 that engage the shank portion 33. The base of the head portion 34 abuts the ends of the channel sections 80 and 81. Similar channel sections 82 and 83 capture the shank portion 36 of the wedge follower 32 such that the base of the head portion 37 abuts the end of the channels 82 and 83.

In an assembled form, the U-shaped channels at divergent edges 50 and 51 overlie the diverging edges 55 and 54 of the wedge followers 32 and 31. Similarly diverging U-shaped channels at edges 63 and 64 engage and capture the diverging edge portions 65 and 66 respectively of the edge followers 31 and 32. The bolt 46 extends through the saddles 43 and 44, traverses the space between the driving wedges 40 and 41 and then passes through the saddles 71 and 72. As the bolt 46 is rotated in a tightening direction, it acts on nut 90 lying in the aperture of the driving wedge 41. Tabs 91 and 92 at the edges of the aperture prevent the nut 90 from rotating. The driving wedges 40 and 41 move toward each other and the center line 36. This applies a force to the wedge followers 31 and 32 that separates the end sections 27 and 28 along the axis 36. Force is applied from the base of the head portions 34 and 37 against the ends of the channel portions 80, 81, 82 and 83 to produce that displacement.

Figure 7:
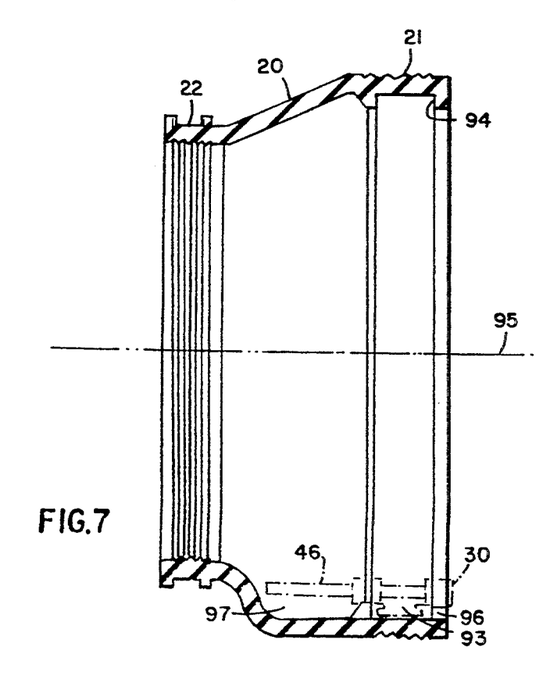
FIG. 7 is a cross-sectional view of the connector boot adapted for use with the expansion mechanism in FIGS. 4 through 6.

FIGS. 4 and 7 depict a connector boot 20 with an end section 21 and an end section 22 modified to provide improved operation with respect to the operating mechanism 30. More specifically, the boot 20 is modified by forming first and second pockets in the boot. As shown in FIG. 7, a first pocket is coextensive with a circumferential channel 94 that extends about the interior wall of the end section 21. This channel 94 locates the band 24 along an axis 95. The pocket 93 is coextensive with the mechanism and extends from an end surface 96. A second pocket 97 extends toward the end 22 over a circumferential area corresponding to the dimensions of the bolt. The pockets 93 and 97 allow the mechanism to be used even with small diameter pipes and with connector boots having large tapers. As the mechanism 30 extends and tightens, the bolt 46 will not penetrate or engage the material of the connector boot 20 thereby maintaining its integrity.

A tab 100, shown in phantom in FIG. 5, overlies the exterior of the band 23 at the gap between the end sections 27 and 28. This tab 100 assures an even application of pressure completely around the circumference of the connector boot.

FIGS. 8 through 11 depict an alternative structure for the driving wedges 40 and 41 shown in FIGS. 5 and 6. In this particular alternative, the wedges have slight variations so the driving wedges are depicted as driving wedge 101 in FIGS. 8 through 11 and driving wedge 102 in FIG. 12.

Figure 8:
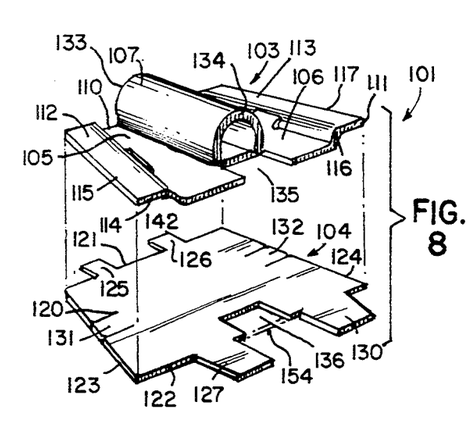
FIG. 8 is an exploded perspective view of the components of an alternative driving wedge that can be utilized in connection with the expansion mechanism shown in FIGS. 5 and 6.

Referring to FIGS. 8 through 11, the driving wedge 101 is formed of two stamped metal components 103 and 104. The stamped metal component 103 has two spaced base sections 105 and 106 (FIGS. 8 and 10) connected by a u-shaped channel 107. Referring particularly to FIG. 8, The component 103 has a generally trapezoidal shape with an inner edge 110, and outer parallel edge 111 and diverging edge portions 112 and 113. The diverging edge portion 112 comprises an offsetting section 114 and a section 115 that parallels the base section 105, but is offset therefrom. Similarly the diverging edge section 113 includes an offsetting section 116 and a parallel section 117.

The bottom stamped metal component 104 has a planar, generally trapezoidally-shaped base 120 with an inner edge 121, an outer edge 122 and diverging edges 123 and 124. Spaced tabs 125 and 126 extend from the inner edge 121 and oppositely extending spaced tabs 127 and 130 extend from the outer parallel edge 122. Each of the edge portions 123 and 124 is essentially centrally stamped with deformable sections 131 and 132.

Figure 9:
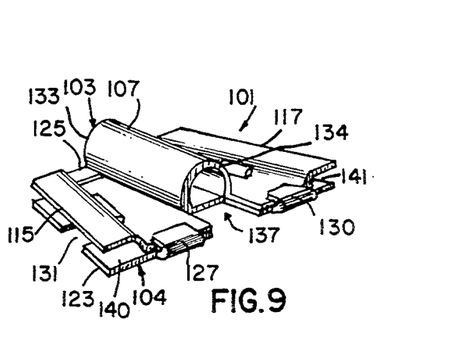
FIG. 9 is a perspective view of the components shown in FIG. 8 in assembled form.
Figure 10:
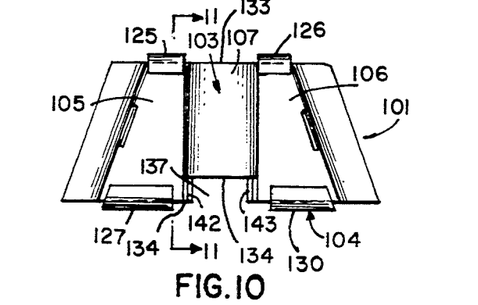
FIG. 10 is a top view of the structure shown in FIG. 9.
Figure 11:
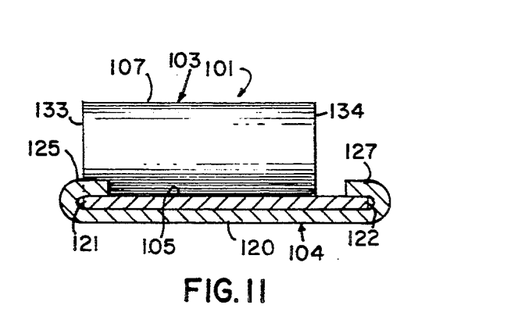
FIG. 11 is a cross-sectional view taken along lines 11—11 as shown in FIG. 10.

The saddle 107 has a first edge 133 that is coextensive with the inner edge 110. An outer edge 134 terminates at a position that is spaced from the outer parallel edge 122 to form a notch 135. The bottom component 104 is formed with a corresponding notch 136. When the top and bottom components and their respective edges are aligned, the notches 135 and 136 align to form a notch 137 as shown in FIG. 9. Tabs 125, 126, 127 and 130 can be rolled as shown in FIG. 11 to produce the assembled structure shown in FIG. 9. The tabs 131 and 132 are separately moved to an upstanding position to bear against the underside of the edge sections 112 and 113 thereby to stiffen the structure and provide appropriate spacing. Parallel edge sections 115 and 117 coact with portions of the edges 123 and 125 to produce channels 140 and 141 along the diverging edge sections that are equivalent to the channels 50, 51, 63 and 64 in FIGS. 5 and 6. The notches 135 and 136 can also be beveled to provide beveled edges 142 and 143 at opposite sides of the combined notch 137 that supports and captures the edge of the nut thereby to prevent its rotation during operation.

Figure 12:
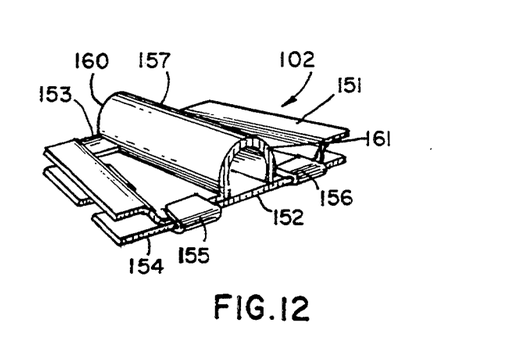
FIG. 12 is an assembled view of a second driving wedge that can be utilized in conjunction with the driving wedge shown in FIG. 9.

FIG. 12 depicts an assembled wedge 102 that has a similar structure to that shown in FIGS. 8 through 11. Consequently only differences are described. The wedge 102 has top and bottom components 151 and 152 like the wedge 101 with its top and bottom components 103 and 104. The wedge 102 also defines an inner edge 153 and an outer parallel edge 154. In the wedge 102, however, the edge 154 is extends continuously in a straight line between tabs 155 and 156 that correspond to tabs 127 and 130 in FIGS. 8 through 11. This closes the notch in the bottom component 152 that corresponds to the notch 137 in FIGS. 8 through 11. The top component also includes a saddle 157 with a first end 160 that is aligned with the inner edge 153. As distinguished from the structure shown in FIGS. 8 through 11, an outer edge 161 is aligned with the outer parallel edge 154.

The use of the wedges shown in FIGS. 8 through 12 is similar to that shown in FIGS. 5 and 6. More specifically, a compression bolt will be inserted through the saddles 107 and 157 with its head bearing against the outer parallel edge 154 of the wedge 102. A nut will lie in the notch 137. Thus as the bolt tightens, the beveled wedges 142 and 143 prevent the nut from rotating and the wedges 101 and 102 advance toward each other to separate the end sections of the clamping band.

In some applications the friction between the various components using metal wedges and followers can be excessive. Moreover, the friction can vary from application to application and even during the sealing operation for a given expansion structure. Thus it is difficult with these systems to provide any torque specification at which it can be assured that a given torque on a compression bolt will produce a particular sealing force. These systems generally define an angle with respect to a transverse axis, such as the axis 248 in FIG. 3, in the range of 35° to transverse axis in order to achieve an acceptable compromise between the mechanical advantage of the ramp produced between the wedges and drivers and followers and the displacement of the wedges needed to produce a given displacement of the followers and end sections. In most cases this results in the extension of a bolt, such as the bolt 46 shown in FIG. 6 beyond a nut 55 and even beyond an inner wedge.

Figure 13:
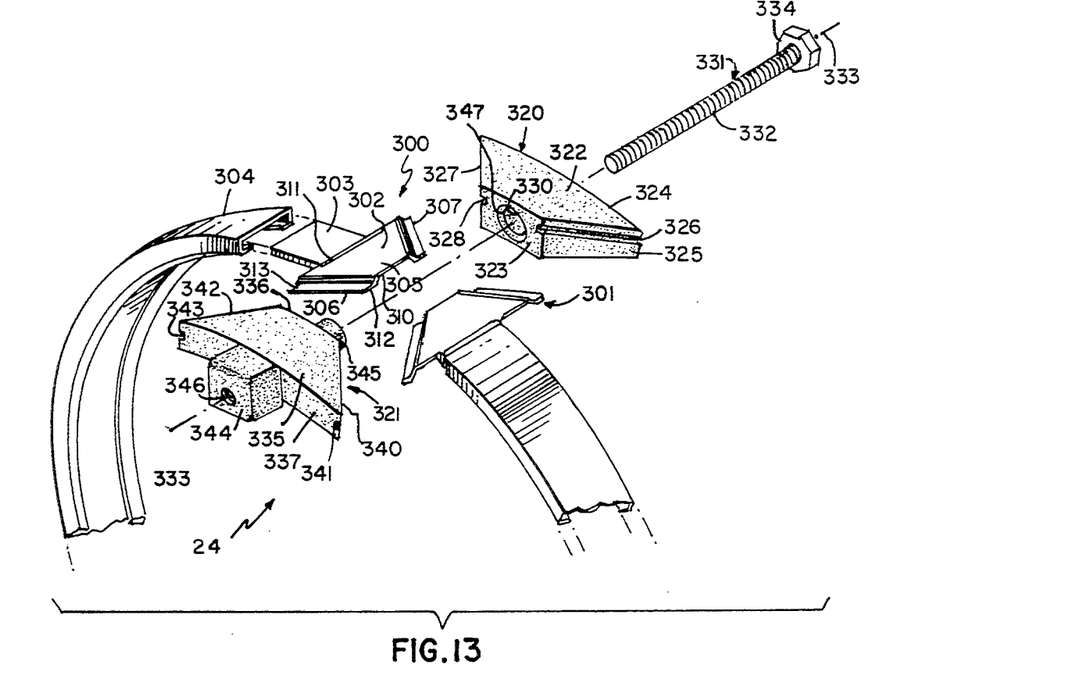
FIG. 13 is an exploded perspective view of a third embodiment of an expansion mechanism including a plastic driving wedge.
Figure 14:
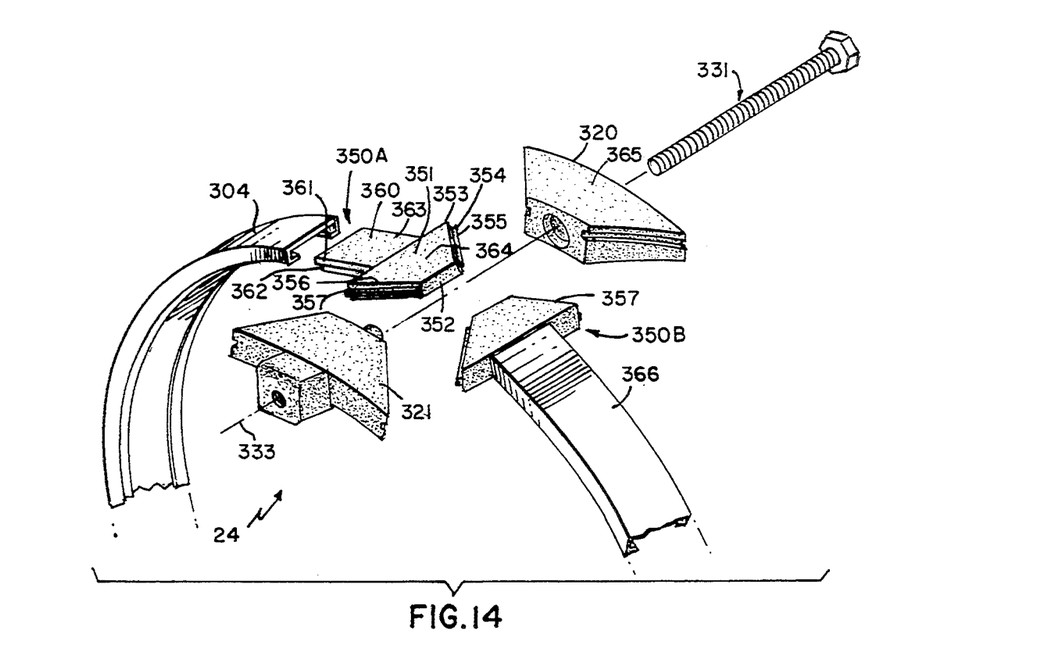
FIG. 14 is an alternative structure to the apparatus shown in FIG. 13 that incorporates plastic driving wedges and followers.

The embodiments of FIGS. 13 and 14 reduce sliding friction in the system and the variation in that friction during a sealing operation. Consequently the structure provides more predictable friction and more repeatable results in terms of the sealing force generated for a given torque on a compression bolt. Further this reduction in friction allows the angle with respect to the transverse axis, to increase to 45° so that the displacement of the driving wedges required to obtain a given displacement of the followers is reduced over the embodiments shown in FIGS. 5 through 12.

Referring specifically to FIG. 13, an expansion apparatus in accordance with this embodiment connects to a connector band 24 and includes identical followers 300 and 301. The follower 300, as an example, includes a trapezoidal head 302 and an offset shank 303 that slides into an end section 304 of the connector 24. The trapezoidal head 302 has a stamped metal body 305 with diverging edge sections 306 and 307, an inner edge 310 and an outer parallel edge 311. The diverging edges 306 and 307 having identical structures. By way of example, the diverging edge 306 includes a radially offsetting section 312 and a tongue 313 that extends substantially parallel to, but offset from the trapezoidal head 302. In FIG. 13 the follower 301 is shown in position in the end of the connector.

The expansion mechanism also includes a first driving wedge 320 and a second driving wedge 321. The first driving wedge 320 has a trapezoidal body 322 bounded by an inner edge 323, a parallel edge 324, a diverging edge 325 with a groove 326 formed therein and a diverging edge 327 with a groove 328 formed therein. A central opening 330 receives a compression structure in the form of a bolt 331 that has a threaded section 332 lying along an axis 333 and a head 334 that contacts the outer parallel edge 324.

The driving wedge 321 has a generally trapezoidally-shaped head 335 with an inner edge 336, an outer parallel edge 337, a diverging edge 340 with a groove 341 formed therein and a diverging edge 342 with a groove 343 formed therein. The driving wedge 321 additionally includes extensions 344 and 345 that lie along the axis 333 as shown in FIG. 13 and that extend from the outer parallel edge 337 and inner parallel edge 336 respectively. A threaded passage 346 extends along the axis 333 through the extensions 344 and 345 and the body portion 335.

As will be apparent, when this structure is assembled, tongues, such as the tongue 313, engages a corresponding groove, such as groove 343 to interfit the followers 300 and 301 with the driving wedges 320 and 321. As the bolt 331 is advanced through the passage 330 and into the threaded passage 346, it draws the wedges 320 and 321 together. In this particular structure the wedges can actually reach a point at which the inner edges 323 and 336 contact each other. To facilitate this increase in motion, the driving wedge has a recess 347 formed in the inner edge 323 along the axis 333 thereby to receive the extension 345.

Each of the wedges 320 and 321 is readily produced by molding plastic by conventional techniques such as injection molding. The plastic must be stable in the environment of sewer systems and that it have sufficient strength in compression to withstand the forces generated during the sealing operation. A wide variety of plastic materials that are readily molded by processes such as injection molding are adaptable including polyvinylchloride, filled polyvinylchloride, nylon and similar materials.

This combination of plastic driving wedges and metal followers dramatically reduces the sliding friction during a sealing operation over that produced by metal driving wedges and metal followers. As a result two significant advantages result. First, as previously indicated, the angle formed by the diverging edges and the transverse axis 337 can increase from 35° to 45° or more so that less displacement of the driving wedges is required to obtain a given displacement of the followers. Moreover, the reduction in friction reduces the necessary torque which would be applied to the bolt 333 to obtain the same sealing force. The range of sliding friction encountered during a given operation also is significantly reduced and more predictable. In addition, the reduction in the displacement of the wedges required to obtain a given sealing force has the advantage of allowing the expansion mechanism in FIG. 13 to operate over its entire range of displacements without the bolt 333 emerging from the extension 334. Consequently the bolt is not prone to scoring or rupturing the connector boot when it is assembled.

Still further advantages of the apparatus shown in FIG. 13 can be accomplished by substituting plastic followers for the metal followers in FIG. 13. FIG. 14 discloses such apparatus using identical driving wedges 320 and 321 for being displaced along the axis 333. In this particular embodiment, plastic followers 350A and 350B are substituted for the followers 301 and 302 in FIG. 13.

Referring to FIG. 14, and particularly to the plastic follower 350, a trapezoidal head portion 351 is bounded by an inner edge 352, an outer parallel edge 353, a diverging edge 354 with an extending tongue 355 and a diverging edge portion 356 with an extending tongue 357.

A shank 360 extends from the outer parallel edge 353 and has a generally T-shaped cross section with a top portion 361 that extends in a direction parallel to the axis 333 beyond a vertical base portion 362. The extensions of the top 361 beyond the base 362 provide a structure for engaging the end sections 304 and 305. The outer parallel edge 353 bears against the end section 304 thereby to impart the driving force and a top surface 363 of the shank 360 is recessed with respect to a top surface 364 of the head portion 351 thereby to enable the outer parallel edge 353 to abut the end section 304. The operation of the structure shown in FIG. 14 is identical to the structure shown in FIG. 13. The advantage of this structure is that the sliding friction generated with plastic wedges and plastic followers is even less than the sliding friction produced with plastic wedges and metal followers as discussed with respect to FIG. 13.

When the plastic driving wedges 320 and 321 are utilized, an outer surface, such as an outer surface 365 on the driving wedge 320, is formed as a curve about the central axis of the opening through the connector 24. The radius of this curved surface 365 corresponds to the nominal radius of the connector 24. Given the significant cost reduction by being able to utilize molded plastic structures, shaping the surface 365 either through the molding operation or subsequent processing still produces a lower total manufacturing cost that is associated with metal stamping manufacturer. The outer surfaces of the head portions of the followers 350 and 351 shown in FIG. 14 have a similar surface structure. Specifically the outer surface 366 of the follower 351 would be curved to conform to the nominal radius of the connector 24.

Moreover, in both the embodiments shown in FIGS. 13 and 14, the offsets of the tongues, such as tongue 345 in FIG. 13 and 360 in FIG. 14 and the surfaces, such as surfaces 365 and 366 in FIG. 14, enable the outer surfaces of the four components to generally lie on the surface of a cylinder that includes the outer surface of the connector. In many applications there is no requirement for a tab structure such as the tab 263 shown in FIG. 3.

Therefore, in accordance with this invention, there are disclosed several embodiments of an improved expansion mechanism for bands for effecting seals with sewer pipe connectors and a specific embodiment of an improved connector boot. Each is simple and inexpensive to manufacture. Collectively any embodiment of the expansion mechanism provides the superior sealing of more expensive prior art devices at the manufacturing costs of the less effective toggle expanders. As is apparent, a number of variations are possible. I it is the object of the appended claims to cover all variations and modifications as come within the true spirit and scope of this invention.

What is claimed as new and desired to be secured by Letters Patent of the United States is:

1. In a system for clamping a flexible pipe connector to a pipe wall including a clamping member with a nominal radius of curvature and an outer surface for engaging the pipe connector and spaced first and second end sections that align along a circumferential center line, the improvement of expansion means for altering the separation between the first and second end sections thereby to alter the radius of curvature of the clamping member, said expansion means comprising:

A. first follower means and second follower means each having a shank portion for being inserted along the center line into a corresponding end section of the clamping member and a trapezoidal head portion with a base for overlying the end section and with divergent planar edge portions constituting the sides of the trapezoid, each said follower means having an outer surface that corresponds to the nominal radius of curvature, B. first wedge means and second wedge means adapted for lying in a spaced relationship along an axis that is transverse to the center line to control the separation of said follower means, each of said first and second wedge means having a generally trapezoidal shape with edge means that diverge with respect to the transverse axis, that parallel said follower means edge portions and that terminate with outwardly facing open channel means for receiving said follower means planar edge portions, and having an outer surface for disposition about the transverse axis corresponding to the nominal radius of curvature, and C. compression means for displacing said first and second wedge means with respect to the center line, one of said wedge means having means for receiving said compression means and the other of said wedge means including means for engaging said compression means whereby operation of said compression means changes the separation between the first and second end sections.

2. An expansion means as recited in claim 1 wherein each of said compression means comprises bolt and nut means for being threaded together and said receiving means and said engaging means on said wedge means includes integral U-shaped saddle means for guiding said bolt means along the transverse axis to said nut means and said saddle means on one of said wedge means positioning said nut means.

3. An expansion means as recited in claim 2 wherein each of said U-shaped saddle means comprises first and second saddles for being spaced along the transverse axis to receive a nut means therebetween, at least one of said wedge means including means intermediate said saddle means for preventing rotation of said nut means with respect to said wedge means.

4. An expansion means as recited in claim 2 wherein said base of each wedge means constitute a first of two parallel edges thereof and each of said U-shaped saddle means comprises an elongated saddle formed in said wedge means for alignment along the transverse axis thereby to define a passage for receiving said bolt means, said elongated saddle in one of said wedge means extending between the parallel edges thereof and, in the other of said wedge means terminating at a position spaced from said second parallel edge, said other wedge means additionally including means formed therein aligned with and extending from said saddle to said second parallel edge for engaging said nut means thereby to prevent rotation thereof.

5. An expansion means as recited in claim 2 wherein each of said wedge means is formed of overlying stamped metal components.

6. An expansion means as recited in claim 2 wherein each of said wedge means is formed of bonded overlying stamped metal components.

7. An expansion means as recited in claim 2 wherein each of said wedge means is formed of first and second overlying stamped metal components, one of said components having a plurality of tabs extending therefrom for capturing the other of said components.

8. An expansion means as recited in claim 2 wherein each of said wedge follower means includes a central reinforcing structure formed integrally therewith coextensively with the center line.

9. An expansion means as recited in claim 1 wherein each said wedge means has first and second parallel edges and wherein each of said wedge means is formed of a molded plastic, said compression means including a threaded bolt means having a head for engaging a first parallel edge of said first wedge means and having a threaded portion, said second wedge means having a threaded aperture for alignment with the transverse axis for engaging the threaded portion of said bolt means.

10. An expansion means as recited in claim 9 wherein said second wedge means has extensions said first and second from the parallel edges aligned with the threaded aperture, said extensions having threaded apertures therethrough whereby said second wedge means and said extensions form a continuous threaded aperture for receiving said bolt means.

11. An expansion means as recited in claim 9 wherein the outer surfaces of said wedge means and said follower means are curved about the transverse axis with a radius corresponding to the nominal radius of curvature.

12. An expansion means as recited in claim 9 wherein said channel means in each said wedge means is constituted by a groove formed in said divergent edge means and wherein each said follower means is formed as a metal stamping with said planar edge portions, on said follower means being constituted by tongues extending from said head portion for interfitting with corresponding grooves in said wedge means.

13. An expansion means as recited in claim 12 wherein said tongues and grooves are offset from the outer surfaces of their respective follower means and said wedge means and said outer surfaces are formed to present a curved surface about the transverse axis with a radius corresponding to the nominal radius of curvature.

14. An expansion means as recited in claim 9 wherein said channel means in each said wedge means is constituted by a groove formed on said divergent edge means and wherein each said follower means is formed as a molded plastic component with said planar edge portions in said follower means being constituted by tongues extending from said head portion for interfitting with corresponding grooves in said wedge means.

15. An expansion means as recited in claim 14 wherein said tongues and grooves are spaced from the outer surfaces of their respective follower means and said wedge means and said outer surfaces are curved about the transverse axis with a radius corresponding to the nominal radius of curvature.

16. In a system for clamping a pipe to a manhole riser at an opening through a wall thereof including a flexible connector boot with a first circular end portion for insertion in the opening to be coextensive with portions of the manhole riser wall and a second circular end portion for receiving the pipe and a clamping band having a profile with a nominal radius of curvature and an outer surface for engaging the first circular end portion along a circumferentially extending center line and having spaced first and second end sections, the improvement of expansion means for altering the separation between the first and second end sections thereby to produce a sealing force that effects a seal between said first circular end portion and the wall of the manhole riser, said expansion means including:

A. first planar metal follower means and second planar metal follower means each having a shank portion for being inserted along the center line into an end section of the clamping band and a trapezoidal head portion with a base for overlying the end section and with divergent planar edge portions constituting the sides of the trapezoid, each said follower means being deformable to conform its outer surface to a radius corresponding to the nominal radius of curvature whereby said follower means can conform to the profile of the clamping band, B. first metal wedge means and second metal wedge means adapted for lying in a spaced relationship along an axis that is transverse to the center line to control the separation of said follower means, each of said first and second wedge means having a generally trapezoidal shape and having;
 i. edge means that diverge with respect to the transverse axis and that parallel said follower means edge portions for engaging said edge portions, and
 ii. saddle means located along the transverse axis, each of said wedge means being deformable to conform its outer surface to a radius corresponding to the nominal radius of curvature whereby said wedge means can conform to the profile of the clamping band, and C. compression means having first and second separable components loosely captured by said saddle means in said first and second wedge means respectively for displacing said wedge means with respect to the center line whereby said adjacent divergent edge means on said wedge means engage proximate ones of said planar edge portions on said follower means for increasing the separation between the first and second end sections as said compression means displaces said wedge means toward the center line thereby to cause said clamping band to seal said first circular end portion of said connector boot against the manhole riser.

17. An expansion means as recited in claim 16 wherein each of said divergent edge means on each of said wedge means comprises an elongated U-shaped channel means for engaging and capturing said follower means along a respective divergent edge portion.

18. An expansion means as recited in claim 17 wherein said saddle means comprise U-shaped saddles formed integrally with said wedge means and said compression means comprises bolt and nut means for being threaded together, said nut means being loosely captured at said saddle means on one of said wedge means and said saddle means on both of said driving wedge means guiding said bolt means along the transverse axis to said nut means.

19. An expansion means as recited in claim 18 wherein each of said follower means includes a central reinforcing structure formed integrally therewith coextensively with the center line.

20. An expansion means as recited in claim 18 additionally comprising bearing plate means having central plate means for being interposed between said connector boot and said expansion means and circumferential plate means for being interposed between portions of said first and second end sections of said clamping band, each of said central plate means and said circumferential plate means having positioning means for engaging said expansion means and said clamping band thereby to maintain the position of said bearing plate means relative to said expansion means and said connector boot.

21. An expansion means as recited in claim 18 wherein each of said U-shaped saddle means comprises first and second saddles for being spaced along the transverse axis thereby to receive a nut means therebetween, at least one of said wedge means including means intermediate said saddle means for preventing rotation of said nut means with respect to said wedge means.

22. An expansion means as recited in claim 21 wherein each of said wedge means is formed of bonded overlying stamped metal components.

23. An expansion means as recited in claim 18 wherein said base of each wedge constitutes a first of two parallel edges thereof and each of said U-shaped saddle means comprises an elongated saddle formed in said wedge means for alignment along the transverse axis thereby to define a passage for receiving said bolt means, said elongated saddle in one of said wedge means extending between the parallel edges thereof and, in the other of said wedge means, terminating at a position spaced from said second parallel edge, said other wedge means additionally including means formed therein aligned with and extending from said saddle to said second edge for engaging said nut means to prevent rotation thereof.

24. An expansion means as recited in claim 23 wherein each of said wedge means is formed of first and second overlying stamped metal components, one of said components having a plurality of tabs extending therefrom formed capturing the other of said components.

25. In a system for clamping a pipe to a manhole riser at an opening through a wall thereof including a flexible connector boot with a first circular end portion for insertion in the opening to be coextensive with portions of the manhole riser wall and a second circular end portion for receiving the pipe and a clamping member having a profile and with a nominal radius of curvature and an outer surface for engaging the first end portion along a circumferentially extending center line and having spaced first and second end sections, the improvement of expansion means for altering the separation between the first and second end sections thereby to alter the radius of curvature of the clamping member, said expansion means comprising:

A. first follower means and second follower means each having a shank portion for being inserted along the center line into a corresponding end section of the clamping member and a trapezoidal head portion with a base that overlies the end section and with divergent planar edge portions constituting the sides of the trapezoid, each of said edge portions including a tongue extending therefrom and each of said follower means having an outer surface that corresponds to the nominal radius of curvature, B. first plastic wedge means and second plastic wedge means adapted for lying, in a spaced relationship along an axis that is transverse to the center line to control the separation of said follower means, each of said first and second wedge means having a generally trapezoidal shape with edge means that diverge with respect to the transverse axis, that parallel said follower means edge portions and that terminate with outwardly facing grooves for receiving said tongues on said follower means and having an outer surface for disposition about the transverse axis that corresponds to the nominal radius of curvature, and C. compression means for alignment along the transverse axis and for displacing said first and second wedge means with respect to the center line, each of said wedge means including means for engaging said compression means whereby operation of said compression means changes the separation between the first and second end sections of the clamping member.

26. An expansion means as recited in claim 25 wherein each of said wedge means has inner and outer parallel edges and said compression means includes threaded bolt means having a head for engaging said outer parallel edge of said first wedge means and having a threaded portion, said second wedge means having a threaded aperture between said inner and outer parallel edges aligned with the transverse axis for engaging the threaded portion of said bolt means.

27. An expansion means as recited in claim 26 wherein said second wedge means has extensions from said inner and outer parallel edges thereof with apertures therethrough that align with the threaded aperture whereby said second wedge means and said extensions form a continuous threaded aperture for receiving said bolt means.

28. An expansion means as recited in claim 27 wherein said first wedge means includes a recess formed on the inner parallel edge thereof for receiving said extension on said parallel edge of said second wedge means.

29. An expansion means as recited in claim 25 wherein each of said first and second wedge means has a surface for engaging the pipe connector, said surfaces being curved about the transverse axis with the nominal radius of curvature.

30. An expansion means as recited in claim 29 wherein each of said follower means radially offsets its corresponding tongues and shank portion from the outer surface of said head portion and forms said shank and head portions with the nominal radius of curvature whereby the outer surface of said head portion constitutes an extension of the clamping member surface.

31. An expansion means as recited in claim 30 wherein the end sections of the clamping member have counterfacing channels disposed oppositely from the pipe connector engaging surface and wherein each of said shank portions constituting a substantially planar member that engages each of the counterfacing channels.

32. An expansion means as recited in claim 30 wherein each of said wedge means has inner and outer parallel edges and said compression means includes threaded bolt means having a head for engaging an outer parallel edge of said first wedge means and having a threaded portion, said second wedge means having a threaded aperture between said inner and outer parallel edges aligned with the transverse axis for engaging the threaded portion of said bolt means.

33. An expansion means as recited in claim 32 wherein said second wedge means has extensions from said inner and outer the parallel edges thereof with apertures therethrough that align with the threaded aperture whereby said second wedge means and said extensions form a continuous threaded aperture for receiving said bolt means.

34. An expansion means as recited in claim 32 wherein each of said follower means is formed of plastic.

35. An expansion means as recited in claim 25 wherein each of said follower means radially offsets its corresponding tongues and shank portion from the outer surface of said head portion and forms said shank and head portions with the nominal radius of curvature whereby the outer surface of said head portion constitutes an extension of the clamping member surface.

36. An expansion means as recited in claim 35 wherein each of said follower means is formed of plastic.

37. An expansion means as recited in claim 25 wherein each of said follower means is formed of plastic.

38. An apparatus for connecting a pipe to a manhole riser at an opening through a wall thereof including a connector boot with a first circular end portion for insertion in the opening of the manhole riser to be coextensive with portions of the wall, a second circular end portion for receiving the pipe and a central transition portion interconnecting said first and second end portions, a clamping band extending along a circumferentially extending center line with spaced first and second end sections and expansion means, having compression means including a portion adapted to extend transversely from said clamping band for producing the expansion and for altering the separation between the first and second end sections thereby to produce a sealing force that effects a seal between said first circular end portion and the wall of the manhole riser, the improvement comprising pocket means, being formed in an interior surface of the connector boot, for receiving the expansion means including the compression means so the compression means remains spaced from the interior surface of the connector boot.

39. The apparatus for connecting a pipe to a manhole riser as recited in claim 38 wherein the compression means is loosely captured by saddle means for producing the expansion and altering the separation and wherein said pocket means includes first and second pockets, said first pocket for receiving the expansion means proximate the clamping band and said second pocket being angularly centered on said first pocket and extending longitudinally into the boot central transition portion for receiving the portion of the compression means adapted to extend transversely from said clamping band, whereby said compression means remains spaced from the interior surface of the connecting boot when disposed in said second pocket.

* * * * *